United States Patent [19]

Opel et al.

[11] 4,207,917
[45] Jun. 17, 1980

[54] HAND-OPERATION DEVICE FOR SOLENOID VALVES

[75] Inventors: Detlef Opel, Haste; Rudolf Möller, Hanover, both of Fed. Rep. of Germany

[73] Assignee: WABCO Westinghouse GmbH, Hanover, Fed. Rep. of Germany

[21] Appl. No.: 946,249

[22] Filed: Sep. 27, 1978

[51] Int. Cl.² .................... F16K 35/00; F16K 31/06
[52] U.S. Cl. .................................... 137/269; 251/130
[58] Field of Search ........................ 251/130; 137/269

[56] References Cited

U.S. PATENT DOCUMENTS

| | | | |
|---|---|---|---|
| 2,389,387 | 11/1945 | Rutherford et al. | 251/130 X |
| 2,608,353 | 8/1952 | Cobb | 251/130 X |
| 2,695,154 | 11/1954 | Dillman | 251/130 X |
| 2,828,102 | 3/1958 | Larson | 251/130 X |

FOREIGN PATENT DOCUMENTS 990655  4/1965  United Kingdom ............... 251/130

Primary Examiner—Arnold Rosenthal
Attorney, Agent, or Firm—R. W. McIntire, Jr.

[57] ABSTRACT

A manually operable actuation pin for operatively engaging the solenoid armature of an electromagnetic valve device is provided to permit manual emergency or auxiliary control of the armature. The actuation pin is designed to permit locking in its actuated position by rotation thereof. The operating end of the actuation pin is arranged with an inner segment, an intermediate segment and an outer segment defined by annular grooves therebetween adapted to facilitate separation of the respective segments. One or more of these segments may be removed to obtain a specific operating characteristic in accordance with which the actuating pin is to be operated.

9 Claims, 16 Drawing Figures

HAND-OPERATION DEVICE FOR SOLENOID VALVES

BACKGROUND OF THE INVENTION

The present invention is concerned with the emergency or auxiliary operation of electromagnetic directional control valves and particularly with a manually operable actuating device for effecting such emergency or auxiliary operation.

Manually operable armature actuating devices in directional valves of the electromagnetic type are desirable for permitting manual disengagement of the solenoid armature during the absence of electric power, such as when a power failure occurs or the power is cut off to permit maintenance or installation of equipment. In the case of such manual operation, it is necessary to move the solenoid armature manually, independently of electrical power which normally effects armature movement, to a position in which the armature effects disengagement of a valve associated therewith from its seat to establish fluid pressure communication for the compressed air or other control medium supplied to the directional valve.

In the past, such manual disengagement of the solenoid armature has been provided by an eccentric operated either by hand or by a tool. While this accomplishes the task of disengaging the armature, it fails to provide the option of either hand or tool actuation, as desired.

SUMMARY OF THE INVENTION

The object of the present invention is to provide manual disengagement of an electromagnetic valve armature by hand or an appropriate tool, either such mode of operation having a further option of maintaining the armature disengaged, such operating modes for manual armature actuation being selectable at the time of installation in accordance with the peculiarity of the desired operating condition.

In accordance with the present invention, this objective is reached by providing an actuating pin for the armature with a plurality of individually detachable end segments, each of which present a configuration which lends itself to a particular mode of operation.

Other objects and advantages of the invention will appear in the following more detailed description of the invention when taken with the drawings.

DESCRIPTION AND OPERATION

Figure 1:
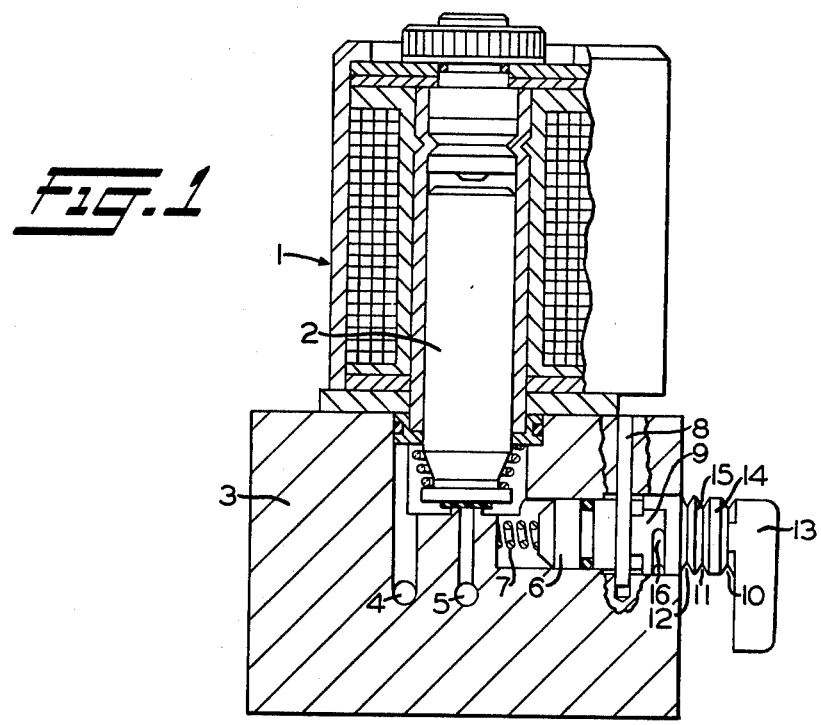
FIG. 1 of the drawings is an assembly view of an electromagnetic type valve device shown in section and including the manual armature actuation pin of the invention.
Figure 2:
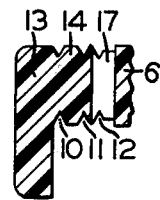
FIG. 2 is a partial side elevation of the actuation pin shown in section.
Figure 3:
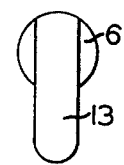
FIG. 3 is an end view of the actuation pin of FIG. 2.
Figure 4:
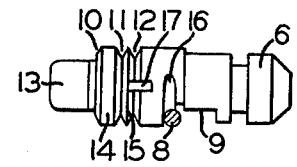
FIG. 4 shows the actuation pin removed from the electromagnetic valve device of FIG. 1.

Referring to FIG. 1, electromagnetic valve device 1 includes an armature 2 having a valve element engageable with a seat formed in the body 3 between a pair of passageways 4 and 5, one of which is for the delivery of fluid pressure such as compressed air and the other of which supplies the air.

In the body 3, there is provided a bore transverse to armature 2 in which an actuation pin 6 preferrably formed of a plastic material is operably disposed. A spring 7 is arranged between the bottom of the bore and the inner end of the actuating pin to urge the pin outwardly. A cylindrical locking pin 8 is set in body 3 transverse of pin 6 and offset slightly from the axis thereof so as to engage a flat 9 formed on the cylindrical surface of actuating pin 6 and thereby prevent its rotation, except when moved to an actuating position, as hereinafter explained. Pin 8 further engages the stop shoulder formed by the flat 9 and cylindrical surface of pin 6 to limit the outward movement of pin 6 by spring 7 and accordingly define the deactuated position of actuating pin 6 and to prevent its displacement from the bore.

At the outer or head end of pin 6, there is provided a plurality of cylindrical grooves 10, 11 and 12 that encircle pin 6 and delineate detachable end segments 13, 14 and 15.

Toward the outer end of pin 6, flat 9 is formed with a groove 16 that partially encircles pin 6 and is adapted to receive lock pin 8 when pin 6 is moved to its actuated position and rotated. In this manner, pin 6 can be locked in its actuated position.

A slot 17 is provided at the head end of pin 6 and is exposed only upon removal of the detachable segment 15 from pin 6. The slot 17 may be such as to receive a screwdriver head for the purpose of tool actuation and locking of actuation pin 6.

As depicted in FIGS. 5, 8, 11 and 14, dimension (a) represents the idle stroke of actuation pin 6 required to move from its deactuated position to a position in which the solenoid armature is contacted by the actuation pin. Due to the inner end of actuation pin 6 being tapered, solenoid armature 2 is raised, as pin 6 is depressed beyond its idle stroke, accordingly unseating its valve element.

Figure 5:
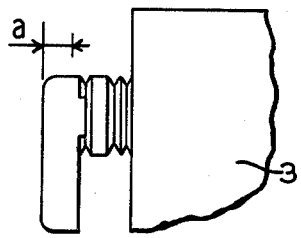
FIG. 5 shows a partial view of a valve housing with the actuation pin in its deactuated position.
Figure 6:
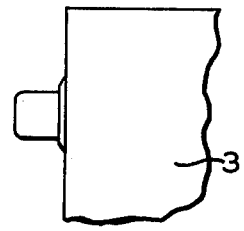
FIG. 6 shows the actuating pin locked in an actuated position.
Figure 7:
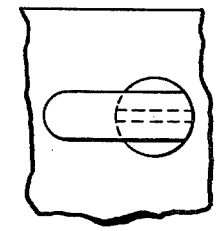
FIG. 7 shows an end view of FIG. 6.

In the arrangement of FIGS. 5, 6 and 7, each segment 13, 14 and 15 is left intact, it being noted that segment 13 is provided with a handle by which an operator can move the actuation pin to its actuated position and subsequently effect its rotation to lock the actuation pin in this actuated position, as in FIGS. 6 and 7. This arrangement thus accommodates the hand mode of manual armature operation and locking.

Figure 8:
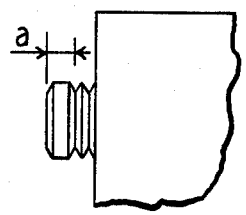
FIG. 8 shows a partial view of a valve housing with the actuation pin having its outermost segment removed to prevent its being locked in an actuated position.
Figure 9:
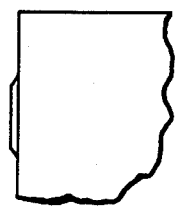
FIG. 9 shows the actuating pin in its actuated position with the outermost segment removed.
Figure 10:
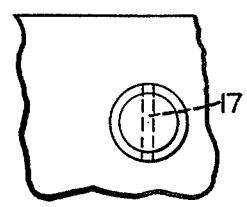
FIG. 10 shows an end view of FIG. 9.

In the arrangement of FIGS. 8, 9 and 10, outer segment 13 is broken away at groove 10, thus eliminating the handle by which the actuation pin can be hand locked. Accordingly, this arrangement accommodates a mode of operation that permits hand actuation of pin 6 but precludes locking of the actuation pin by the absence of segment 13. Upon releasing actuation pin 6, return spring 7 will be effective to move the actuation pin to its normal deactuated position.

Figure 11:
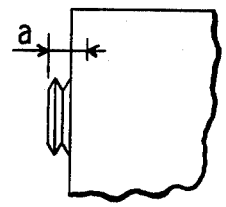
FIG. 11 shows a partial view of a valve housing with the actuation pin having its outermost and intermediate segments removed to prevent its actuation by hand and thus require a tool for actuation.
Figure 12:
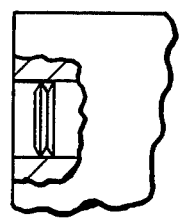
FIG. 12 shows the actuating pin in its unlocked actuated position with the outermost and intermediate segments removed.
Figure 13:
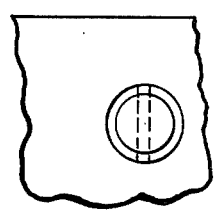
FIG. 13 shows an end view of FIG. 12.

In the arrangement of FIGS. 11, 12 and 13, intermediate segment 14 is broken away at groove 11. Since actuation pin 6 can only be depressed by hand until its end is flush with body 2, it can be seen from FIG. 11 that the available movement of pin 6 by hand is insufficient to traverse distance (a), thus rendering pin 6 inoperable by hand. Thus, this arrangement accommodates a mode of operation in which it is desirable to employ a tool to depress pin 6 for emergency or auxiliary actuation of armature 2. In the absence of any provision for effecting rotation of pin 6 in its depressed or actuation position, however, the armature is only actuated so long as the actuation pin 6 is held depressed, due to return spring 7.

Figure 14:
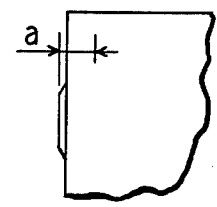
FIG. 14 shows a partial view of a valve housing with the actuator pin having all its detachable segments removed to prevent its actuation by hand and thus require a tool for actuation, the actuator pin being lockable in its actuation position by the tool.
Figure 15:
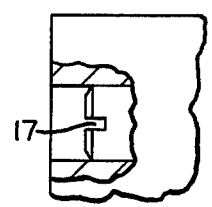
FIG. 15 shows the actuating pin of FIG. 14 in its actuated and locked position.
Figure 16:
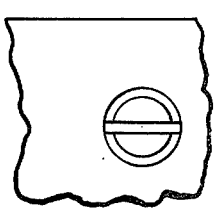
FIG. 16 shows an end view of FIG. 15.

In the arrangement of FIGS. 14, 15 and 16, inner segment 15 is broken away at groove 12, thereby exposing the head of pin 6 in which is formed slot 17 to accommodate a screwdriver for turning pin 6 to its locked position subsequent to moving the pin to its actuated position. Accordingly, this arrangement accommodates a mode of service requiring a tool to effect actuation of pin 6 and locking thereof to effect and maintain emergency or auxiliary actuation of armature 2.

From the foregoing, it will now be appreciated that the present device provides in a single item the possibility of allowing selective modes of service to be obtained, as desired, at the time of installation, with assurance that only the chosen mode is thereafter available. The advantages of such device, as provided by the present invention lies in the universal versatility of the manually operated actuation pin and the reduction and simplification of the parts inventory.

Having now described the invention, what we claim as new and desire to secure by Letters Patent, is:

1. An auxiliary actuator for an electromagnetic control valve device having a valve member associated with the armature thereof via which fluid pressure communication is controlled between passageways formed in said control valve device, said auxiliary actuator comprising a manually operable actuating pin having:
   (a) a shank portion disposed in a bore of said control valve device for axial movement between a deactuated position and an actuated position of said actuating pin, said shank portion constituting one end of said actuating pin for engagement with said armature in said actuated position to thereby effect operation of said valve member; and
   (b) an actuating portion at the other end of said actuating pin having an inner, an outer and an intermediate segment, adjacent ones of said segments, and said inner segment and said shank portion being defined by an annular groove therebetween, whereat respective ones of said segments are removable to condition said actuating portion for movement of said actuating pin to said actuated position by a selectable one of a plurality of operating modes.

2. An auxiliary actuator, as recited in claim 1, further comprising limit means for defining said actuated and deactuated positions of said actuating pin.

3. An auxiliary actuator, as recited in claim 2, further comprising locking means including said limit means for maintaining said actuating pin in said actuated position upon rotation thereof in said bore following movement to said actuated position.

4. An auxiliary actuator, as recited in claim 2, wherein said limit means comprises:
   (a) said shank portion of said actuating pin having a generally cylindrical surface with a flat formed along a portion thereof to provide an elongated slot between said bore and said flat; and
   (b) a lock pin arranged in the body of said valve device so as to pass through said bore via said slot, whereby the opposite ends of said slot provide a stop for engagement by said lock pin to define said actuated and deactuated positions of said actuating pin.

5. An auxiliary actuator, as recited in claim 4, wherein said actuating pin includes an annular groove formed at one end of said slot to receive said lock pin in response to rotation of said actuating pin in said actuated position to lock said actuating pin in said actuated position.

6. An auxiliary actuator, as recited in claim 1 or 5, wherein said actuating portion, including at least said inner and intermediate segments thereof, projects from said bore at least a predetermined distance corresponding to the degree of axial movement of said actuating pin between said actuated and deactuated positions, to thereby establish a hand actuated mode of operation.

7. An auxiliary actuator, as recited in claim 6, wherein said outer segment of said operating portion includes an operating handle to permit manual rotation of said actuating pin in said bore in said hand actuated mode of operation.

8. An auxiliary actuator, as recited in claim 2 or 5, wherein the distance said inner segment projects from said bore upon separation of said outer and intermediate segments therefrom is less than said predetermined distance, to thereby establish a tool actuated mode of operation.

9. An auxiliary actuator, as recited in claim 8, wherein said shank portion is provided with a tool receiving slot that is exposed only when said inner segment of said actuating portion is separated from said shank portion at said annular groove therebetween, said shank portion extending beyond said bore a distance less than said predetermined distance.

* * * * *